United States Patent
Knudsen et al.

(10) Patent No.: US 9,593,239 B2
(45) Date of Patent: *Mar. 14, 2017

(54) POLAR SOLUBLE OXYGEN SCAVENGING COMPOSITIONS AND ARTICLES THEREOF

(71) Applicant: Chemtex Italia, S.p.A., Tortona, AL (US)

(72) Inventors: Ricardo Knudsen, Sao Paulo (BR); D. Jeffrey Black, Akron, OH (US); Gianluca Ferrari, Portograuaro (IT); Aaron Murray, Chardon, OH (US)

(73) Assignee: Biochemtex, S.p.A., Tortona (AL) (IT)

( * ) Notice: Subject to any disclaimer, the term of this patent is extended or adjusted under 35 U.S.C. 154(b) by 417 days.

This patent is subject to a terminal disclaimer.

(21) Appl. No.: 13/854,934

(22) Filed: Apr. 1, 2013

(65) Prior Publication Data
US 2013/0256323 A1 Oct. 3, 2013

Related U.S. Application Data

(60) Provisional application No. 61/618,832, filed on Apr. 1, 2012.

(51) Int. Cl.
*C08L 67/03* (2006.01)
*C08K 5/01* (2006.01)
(Continued)

(52) U.S. Cl.
CPC ............. *C08L 67/03* (2013.01); *B65D 25/00* (2013.01); *C08K 5/01* (2013.01); *C08L 67/04* (2013.01); *C08K 2201/012* (2013.01)

(58) Field of Classification Search
CPC C08L 67/03; C08L 67/04; C08K 5/01; C08K 2201/012; B65D 25/00
See application file for complete search history.

(56) References Cited

U.S. PATENT DOCUMENTS 5,077,111 A * 12/1991 Collette ................... 428/36.7
5,811,027 A * 9/1998 Speer et al. ............. 252/188.28
(Continued)

FOREIGN PATENT DOCUMENTS

EP 0301719 A1 2/1989
WO 2008/124682 A2 10/2008

OTHER PUBLICATIONS

Wolfer Abate D et al., "Unsaturated Polyester Containing Myrcene-Maleic Anhydride Diels-Alder Adduct", Journal of Applied Polymer Science, Sep. 25, 1992, pp. 389-391, vol. 46, No. 3, John Wiley & Sons, Inc., US.

*Primary Examiner* — Peter F Godenschwager
*Assistant Examiner* — Andrew J Oyer
(74) *Attorney, Agent, or Firm* — Edwin A. Sisson, Attorney at Law, LLC; Jeffrey J. Banyas

(57) ABSTRACT

This specification discloses a composition of a melt blend comprising a continuos polyester phase, a cobalt of manganese compound and a first scavenging compound wherein the first scavenging compound comprises at least one allylic group and at least one polar moiety and at least some of the first scavenging compound or the oligomer or the polymer comprising the first scavenging compound is not present in the continuous polyester phase. The partial insolubility is essential for oxygen scavenging and the solubility is essential for reducing haze. The composition is useful in preforms, container walls, and films for packaging.

14 Claims, 2 Drawing Sheets

(51) Int. Cl.
*B65D 25/00* (2006.01)
*C08L 67/04* (2006.01)

(56) References Cited

U.S. PATENT DOCUMENTS

2002/0155236 A1* 10/2002 Cahill et al. .................. 428/35.7
2002/0183448 A1* 12/2002 Tibbitt et al. ................... 525/88
2003/0031815 A1* 2/2003 Schiraldi et al. ............ 428/35.8

* cited by examiner

POLAR SOLUBLE OXYGEN SCAVENGING COMPOSITIONS AND ARTICLES THEREOF

PRIORITY AND CROSS REFERENCES

This application claims priority from U.S. Provisional Patent Application No. 61/618,832 filed 1 Apr. 2012 the teachings of which are incorporated herein in their entirety.

BACKGROUND

The use of scavengers in plastic packaging to increase the barrier to oxygen is well known.

US 20020183448 discloses reacting reactive functionalized polybutadienes with a matrix polyester to form oxygen scavenging preforms and bottles.

The deficiency of this system is that it is still hazy.

While US 20020183448 also discloses unreactive PBD's, it discloses, and is known, that such PBD's form hazy preforms and bottles.

There exists therefore, the need to have a special compound which can be reactive or non-reactive with the polyester polymer matrix yet provides a clear (relatively haze free) preform and bottle from blends of the compound and polyesters or nylons.

SUMMARY

This specification discloses a composition comprising a melt blend comprising a continuous polyester phase selected from the group consisting of polyethylene terephthalate, copolymers of polyethylene terephthalate and poly lactic acid, a salt selected from the group consisting of cobalt and manganese compounds, and a first scavenging compound or an oligomer or a polymer or mixtures thereof comprising the first scavenging compound wherein the first scavenging compound comprises at least one allylic group and at least one polar moiety and at least some of the first scavenging compound or the oligomer or the polymer comprising the first scavenging compound is not present in the continuous polyester phase.

It is further disclosed that the composition further comprises a second scavenging compound or an oligomer or a polymer and mixtures thereof comprising the second scavenging compound and the second scavenging compound or the oligomer or the polymer and mixtures thereof comprises at least one double allylic group and at least one polar moiety.

It is further disclosed that the second scavenging compound comprises

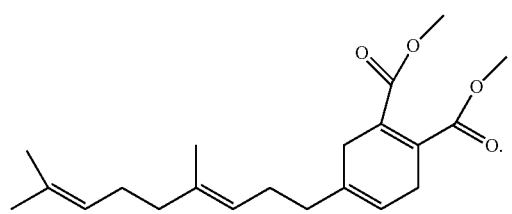 [SMILES: COC(=O)C1=C(C(=O)OC)CC(CC/C=C(\C)CCC=C(C)C)=CC1]

And that the first scavenging compound comprises

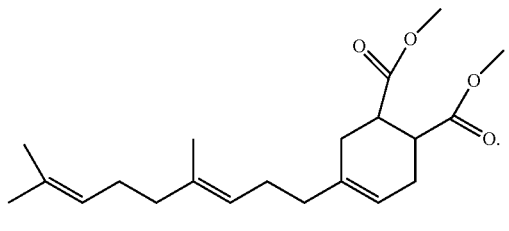 [SMILES: COC(=O)C1CC=C(CC/C=C(\C)CCC=C(C)C)CC1C(=O)OC]

It is disclosed that the first scavenger compound is not an antimony reducing scavenger.

The specification is also to a container made from the disclosed composition and the container may be a preform or have a stretched wall.

DETAILED DESCRIPTION

Figure 1:
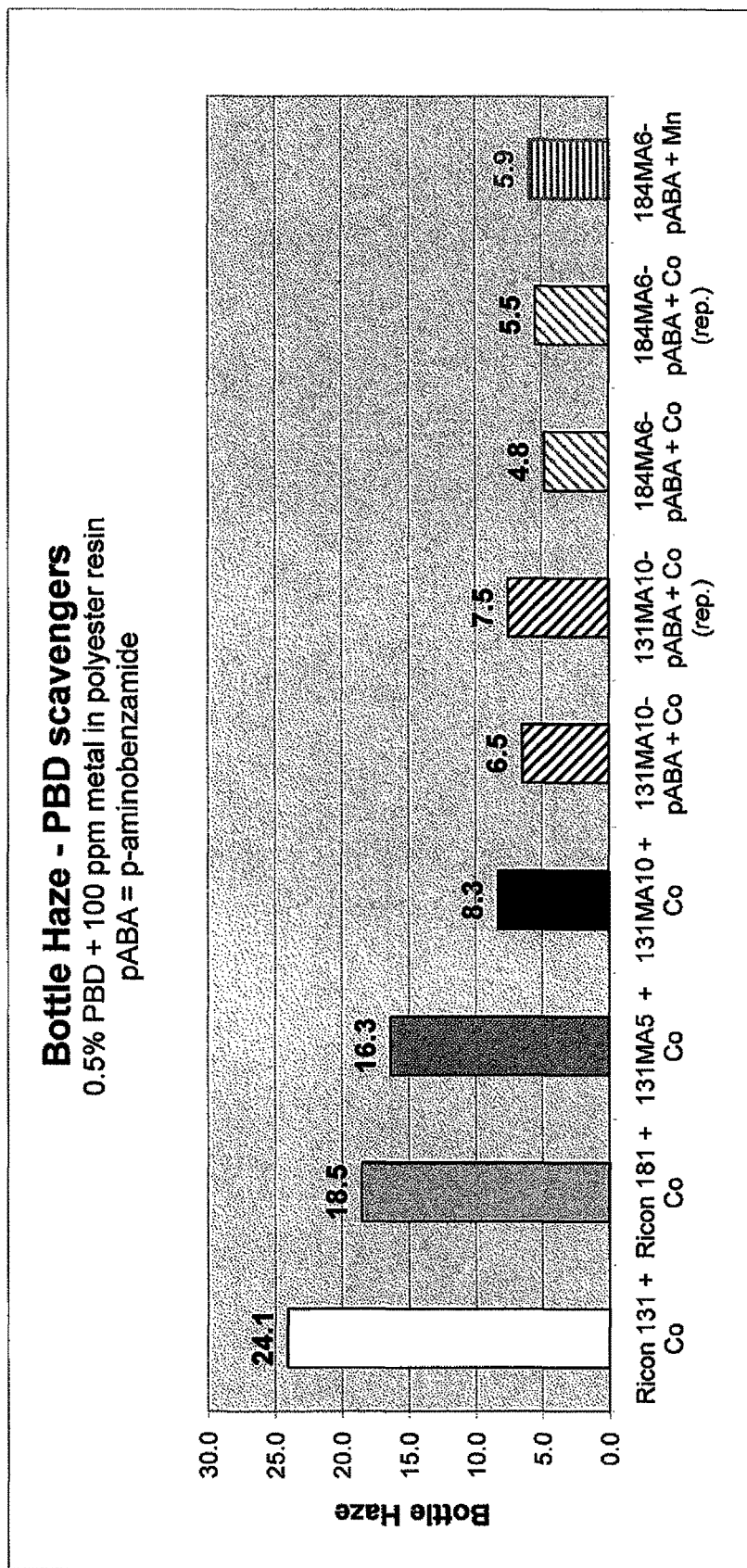
FIG. 1 depicts the haze measurement of several scavenging systems.

This application relies upon the discovery that conventional wisdom regarding the ability of a molecule to function as oxygen scavengers in polyester and other thermoplastic polymers is not applicable. The conventional wisdom is that if a compound/molecule in the presence of a transition metal catalyst reacts with oxygen outside a polymer matrix, that it will react with oxygen when blended with the matrix polymer.

It should be noted that for the purposes of this specification the phrase scavenging compound refers as well to the scavenging molecule.

What has been observed and described in this specification is that there are many compounds that react with oxygen in the presence of a cobalt catalyst outside the polymer, but when melt blended into a continuous polymer matrix in the presence of the same catalyst do not react with oxygen. It has been discovered that certain other attributes of the blend must exist for the scavenging compound to react with oxygen.

The prior art teaches several scavenging compounds which work in a polymer matrix, with MXD6 nylon and polybutadiene being two types of known scavengers.

What has been discovered and explained below is that the compounds which scavenge oxygen have some, if not all the compound present as a separate phase in the thermoplastic matrix. Once the compound is solubilized into the polymer phase, the reaction with oxygen is foreclosed. Therefore, one criteria for oxygen scavenging is that at least a portion of the compound, either as a complete compound or portion of the compound entity, not be in the continuous phase of the blend.

However, compounds with separate phases in the continuous phase are known to produce hazy blends. Efforts to reduce haze in the prior art have focused on increasing the dispersability of the discontinuous phase into smaller particles. Often, this is incorrectly referred to as increasing the compatibility. Until now, no disclosure has discussed the role of solubility (or insolubility) of the oxygen scavenging compound in the matrix polymer relative to oxygen reactivity and haze.

It has been discovered that the polar groups can vary the solubility of the third compound in the polymer matrix, in other words altering the concentration of the compound at which the phase separation occurs. As stated previously, if the compound is completely soluble in the matrix phase, there will be no reactivity with oxygen.

Analogously, haze can also be controlled and minimized by the incorporation of the polar group onto the compound. The polar group choice and size relative to the non-polar, often aliphatic, portion of the compound plays a role. Therefore, in selecting an oxygen scavenging compound, there is a balance between the selected the polar group, the non-polar portion of the scavenging compound and the desired clarity of the container made with the 3 component blend The existence of the separate phase can often be confirmed by Transmission Electron Microscopy.

A special type of oxygen scavenging compound is that which does not reduce antimony in the polyester resin. It has been observed that some scavenging compounds reduce the antimony in the polyester polymer making the blend very dark. The preferred blend therefore will be substantially void of antimony reduced by the presence of the scavenging compound. This is easily determined by measuring and comparing the amount of reduced antimony with and without the presence of the scavenging compounds. If more than 5% more reduced antimony is present in the blend with the scavenger than in the blend without the scavenger, then that scavenger is an antimony reducing scavenger.

With the above in mind, this application is to compositions of compounds which contain at least one allyl group and at least one polar moiety, and the use of such compounds in an oxygen scavenger system in blends with polyethylene terephthalate and polyethylene terephthalate copolymers, nylons or other packaging polymers in the presence of a transition metal catalyst such as cobalt or manganese.

Polyesters suitable for this invention are the film forming polyesters made from the reaction of a diol with a dicarboxylic acid, or its corresponding ester. Various copolymers of multiple diols and diacids may also be used. Polyesters containing repeating units of only one chemical composition such as ethylene terephthalate are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes also referred to as terpolymers.

The term copolymer refers to any polymer with three or more monomers. In the case of PET, the homopolymer is polyethylene terephthalate made from terephthalic acid and ethylene glycol monomers. The addition of isophthalic acid, diethylene glycol, cyclohexane dimethanol or all of them make the PET a copolymer.

It is well known that the polymerization of the dicarboxylic acid with ethylene glycol may also have approximately 1 mole of di-ethylene glycol for the 100 moles of a dicarboxylic acid, 99 moles of ethylene glycol. This is because the di-ethylene glycol is formed in-situ, and although not charged directly into the reactor it will usually be present in the polymer. It is noted the primary repeating unit of polyethylene terephthalate is ethylene terephthalate, as it is found in the polymer chain. It is the reaction product of ethylene glycol with terephthalic acid or its derivative, the dimethyl ester of terephthalic acid, known as dimethyl terephthalate. The nomenclature follows with the other phthalates as well. Ethylene isophthalate has the glycol from ethylene glycol and the isophthalate acid moiety which is derived from isophthalic acid. This isophthalate moiety can come from or be derived from isophthalic acid or the dimethyl ester of isophthalic acid-dimethyl isophthalate; ethylene sulfoisophthalate is treated the same way with the sulfoisophthalate being derived from the corresponding sulfoisophthalic acid (SIPA) or the dimethyl ester of the sulfoisophthalic acid, dimethyl sulfoisophthalate (DMSI). As described below the DMSI is often added to the reactors as the bis-hydroxy ester of the sulfoisopthalate as well.

Suitable dicarboxylic acids include those comprising from about 4 to about 40 carbon atoms. Specific dicarboxylic acids include, but are not limited to, terephthalic acid, isophthalic acid, 2,6 naphthalene dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalene dicarboxylic diesters. Although the above list refers primarily to dicarboxylic acids, it is well known in the art that one can make the equivalent polyester from the corresponding dimethyl ester. Therefore, the phrase derived from a dicarboxylic acid includes polyesters manufactured using the dimethyl ester of the dicarboxylic acid; e.g. derived from terephthalic acid refers to the terephthalate moiety whether the polyester was manufactured using terephthalic acid or dimethyl terephthalate. The same nomenclature applies to the other monomers as well, such as sulfonates, isophthalates, naphthalates, and sulfoisophthalates.

These acids or esters may be reacted with an aliphatic diol preferably having from about 2 to about 24 carbon atoms, a cycloaliphatic diol having from about 7 to about 24 carbon atoms, an aromatic diol having from about 6 to about 24 carbon atoms, or a glycol ether having from 4 to 24 carbon atoms. Suitable diols include, but are not limited to, ethylene glycol, 1,4-butenediol, trimethylene glycol, 1,6-hexanediol, 1,4-cyclohexanedimethanol, diethylene glycol, resorcinol, and hydroquinone.

PolyLactic Acid polymers, or PLA is also believed to be a suitable polyester for this invention.

Polyfunctional comonomers can also be used, typically in amounts of from about 0.01 to about 3 mole percent. Suitable comonomers include, but are not limited to, trimellitic anhydride, trimethylolpropane, pyromellitic dianhydride (PMDA), and pentaerythritol. Polyester-forming polyacids or polyols can also be used. Blends of polyesters and copolyesters may also be useful in the present invention.

The esterification or polycondensation reaction of the carboxylic acids or esters with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred.

Polyesters of this invention can be prepared by virtually any polymerization procedure suitable for polycondensation polymers. The polyester polymers and copolymers may be prepared by melt phase polymerization involving the esterification, or corresponding transesterification of the diester of the monomers followed by melt phase polymerization vacuum. The melt phase polymerization can be done in a batch, continuous or semi-continuous manner, or even a combination.

After completion of the melt phase polymerization, the polyester is either made into a form such as a film or part or stranded and cut into smaller chips, such as pellets. The polyester is usually then crystallized and subjected to a solid phase (solid state) polymerization (SSP) step to achieve the intrinsic viscosity necessary for the manufacture of certain articles such as bottles. The crystallization and polymerization can be performed in a tumbler dryer reactor in a batch-type system. The solid phase polymerization can continue in the same tumble dryer where the polymer is subjected to high vacuum to extract the polymerization by-products Alternatively, the crystallization and polymerization can be accomplished in a continuous solid state polymerization process whereby the polymer flows from one vessel to another after its predetermined treatment in each vessel. The crystallization conditions are relative to the polymer's crystallization and sticking tendencies. However, preferable temperatures are from about 100° C. to about 150° C. In the case of crystallizable polyesters, the solid phase polymerization conditions are generally 10° C. below the melt point of the polymer. In the case of non-crystallizable polyesters, the solid phase polymerization temperature is 10° C. below temperature where the polymer begins sticking to itself. Traditional solid phase polymerization temperatures for crystallizable polymers range from about 200° C. to about 232° C., and more preferably from about 215° C. to about 232° C. Those skilled in the art will realize that the optimum solid phase polymerization temperature is polymer specific and depends upon the type and amount of copolymers in the product. However, determination of the optimum solid phase polymerization conditions is frequently done in industry and can be easily done without undue experimentation.

The solid phase polymerization is carried out for a time sufficient to raise the intrinsic viscosity to the desired level, which will depend upon the application. For a typical bottle application, the preferred intrinsic viscosity (I.V.) is from about 0.65 to about 1.0 deciliter/gram.

One suitable class of polyesters for the practice of this invention is the crystallizable terephthalate or naphthalate polyesters defined as a polyester with more than 85 mole % of its acid units being derived from terephthalic acid or 2,6 naphthalene dicarboxylic acid or their respective dimethyl esters. It is generally accepted that to keep the polymer crystallizable the comonomer content is usually kept below about 15 to 20 mole %.

The term crystallizable polyester means that the polyester, such as polyethylene terephthalate can become semi-crystalline, either through orientation or heat induced crystallinity. No plastic is completely crystalline and the crystalline forms are more accurately described as semi-crystalline. The term semi-crystalline is meant to describe a polymer that exhibits X-ray patterns that have sharp features of crystalline regions and diffuse features characteristic of amorphous regions. It is well known in the art that semi-crystalline should be distinguished from the pure crystalline and amorphous states.

One preferred crystallizable polyester is PET, which is the group of polyesters consisting of polyethylene terephthalate, copolymers of polyethylene terephthalate including copolymers of polyethylene terephthalate modified with metal salt of sulfoisophthalate derived from the di-ester or di-carboxylic acid of sulfoisophthalate (SIPA) in the approximately 1:1 stoichiometric reaction of acids, or their di-esters, with ethylene glycol.

Specific copolymers of interest are the crystallizable polyethylene terephthalates which have at least one sulfoisophthalate as an acid moiety and at least one other acid moiety derived from the comonomers selected from the group consisting of isophthalic acid or its diester, 2,6 naphthalene dicarboxylic acid or its diester, and cyclohexane dimethanol. The preferred sulfoisophthalate is lithium sulfoisophthalate with the levels of lithium sulfoisophthalate within the range of 0.05 and 2.0 mole percent based upon the acid moieties of the polyesters in the composition. While greater than 2.0 mole percent is not deleterious to the intended effect, greater than 2.0 mole percent achieves little or no additional improvement.

Another preferred crystallizable polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. In addition to the interfacial tension reducing agent such as the metal salt of sulfoisophthalic acid, other aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis (acetyl-acetonato)-titanium, di-n-butoxy-bis (triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

Another preferred crystallizable polyester is polyethylene naphthalate, also known as PEN. It is made by the reaction of 2,6 naphthalene dicarboxylic acid or its diester (2,6 dimethyl naphthalate) with ethylene glycol.

It is also contemplated that the crystallizable polyester of the present invention may comprise recycled polyester or materials derived from post-consumer or post-industrial recycled polyester, such as polyester monomers, catalysts, and oligomers.

The nylon or polyamides suitable for this invention can be described as comprising the repeating unit of amino caproic acid or A-D, wherein A is the residue of a dicarboxylic acid comprising adipic acid, isophthalic acid, terephthalic acid, 1,4-cyclohexanedicarboxylic acid, or naphthalene dicarboxylic acid, and D is a residue of a diamine comprising m-xylylene diamine, p-xylylene diamine, hexamethylene diamine, ethylene diamine, or 1,4 cyclohexanedimethylamine.

These polyamides can also be described as comprising at least one reaction product selected from the group consisting of the reaction product of amino caproic acid with itself and/or the reaction product of a residue of a dicarboxylic acid comprising adipic acid, isophthalic acid, terephthalic acid, 1,4-cyclohexanedicarboxylic acid, or naphthalene dicarboxylic acid with a residue of a diamine comprising m-xylylene diamine, p-xylylene diamine, hexamethylene diamine, ethylene diamine, or 1,4 cyclohexanedimethylamine.

Those skilled in the art will recognize many of the combinations as well known commercially available polyamides. The reaction product of the residue of sebacic acid with hexamethylene diamine is nylon 6.10 and the reaction product of the residue of adipic acid and hexamethylene diamine is nylon 6.6. Nylon 6.12 is another nylon which benefits from the invention. Nylon 6 is a special type of polyamide having the formula of $H_2N-(CH_2)_5-COOH$ and is made by the opening of caprolactam and then reacting or polymerizing the resulting amino caproic acid with itself. Nylon 6 is a suitable polyamide polymer, as is the reaction product of the residues of adipic acid and m-xylylene diamine, known as poly-m-xylylene adipamide. This compound is commercially known as MXD6 or nylon MXD6.

The polyamide could also be modified and would have a 0.01-15 mole percent of the respective acid or diamine replaced with an interfacial tension modifying compound such as sulfonated isophthalic acid, discussed below.

The composition also contains a catalyst for the oxidation reaction of the copolymer/co-oligomer with $O_2$. This catalyst is typically a transition metal compound, Co and Mn compounds being typical examples. The catalyst may also be or include N-Hydroxy Phthalimide and other molecules containing a N-hydroxy cyclic imides and their derivatives.

The transition metal catalyst is typically a metal salt. Of particular interest are cobalt compounds some of which include cobalt oxide, cobalt acetate, cobalt carbonate, cobalt naphthenate, cobalt oleate, cobalt linoleate, cobalt octoate, cobalt stearate, cobalt nitrate, cobalt sulphate, cobalt (ethylene glycolate), and mixtures of two or more these, among others. As a transition metal catalyst for active oxygen scavenging, a salt of a long chain fatty acid is preferred, which is well known to be a fatty acid having an aliphatic longer than 12 carbon atoms but less than 23 carbon atoms. Cobalt octoate (which is not a long chain fatty acid) or cobalt stearate, which is a long chain fatty acid are preferred.

Examples of the useful cobalt compounds are the cobalt carboxylates, among them stearates, decanoates, octoates, propionates, acetates, including mixed salts of carboxylates (eg. Co neodecanoate/propionate); Halides (Chlorides, Bromides, Iodides); carbonates and bicarbonates; and sulfates.

Examples of the useful manganese compounds are the manganese carboxylates, among them stearates, decanoates, octoates, propionates, acetates, including mixed salts of carboxylates (eg. Mn neodecanoate/propionate); Halides (Chlorides, Bromides, Iodides); carbonates and bicarbonates; and sulfates.

The useful amounts of the transition metal catalyst such as cobalt and manganese are expressed as parts per million of the metal in the salt by weight of the composition. Useful ranges are 10 to 5000 ppm, with 20 to 800 ppm and 50 to 500 ppm being more preferred. 80 to 290 ppm being the most preferred range for the amount of transition metal in the composition.

The oxygen scavenging compound is a molecule, an oligomer or a polymer which contains at least one allyl group and at least one polar moiety. This polar moiety can be reactive or non-reactive with the polymer matrix. The allyl group may be present in the scavenging compound in structural units derived from isoprene (e.g. terpenes), butadiene (e.g. polybutadienes), styrene (e.g. polystyrenes) and combinations of thereof allyl groups Allyl groups Allyl groups may have, but are not limited to the substituent having a structure:

Where $R_1$ is the rest of the molecule.

The compound may also have double allyl groups. Double allyl groups may have, but are not limited to the structure:

Where $R_1$ and $R_2$ signify that there will be other structures in the molecule.

The compound may also contain conjugated double bonds.

While other parts of the molecule may be oxidizable, the comonomer with allyl groups forms the main oxidizable part of the molecule. A reactive polar moiety means any polar moiety that is reactive towards the polyester resins employed in the blend. Examples of polar functional groups that can react with polyesters are hydroxyl, anhydride, carboxyl.

The non-reactive groups which are non-reactive to polyesters are known to be the amides, imides, nitriles, sulfonates, sulfonamides and structures containing aromatic groups.

A non-reactive polar moiety is one in which no reaction with the matrix polymer is detected using IR technique after 10 parts of the compound with the polar moiety has been blended with 90 parts of the matrix polymer under nitrogen for a period of 2 minutes at a temperature 15° C. higher than the melt point of the matrix polymer without the oxidation catalyst. These polar groups of the non-reactive moiety may include amides, imides, nitrile, sulfonates, sulfonamides and comonomers containing aromatic groups, amongst others.

For clarification, the limitation of non-reactivity is towards just the polyester. The non-reactive polar moiety can be non-reactive to the matrix polyester but reactive to a nylon or polyamide present in the blend. If blended within a polyester matrix, the non-reactive polar moiety lies within the scope of the invention.

The polar moiety produces a physical compatibilization (i.e. increased solubility) of at least a portion of the scavenger compound and copolymers and oligomers thereof with the matrix polymer. By compatibilization it is understood that the blend will display an improved transparency (lower haze) over a system not containing such polar moiety. It is believed that the low haze is due to a better dispersion of the scavenger polymer in the matrix, in the form of smaller particles which produce less scattering of light. Without being bound to any theory, it is believed that the polar moieties help to reduce the interfacial tension between the scavenger polymer and the matrix polymer in the blend. Preferred moieties would contain amides with substituents containing aromatic groups.

The above described scavenger compound, its copolymers or co-oligomers thereof may contain other comonomers to modify their refractive indexes. Such comonomers have higher refractive indices than the aliphatic comonomers employed, increasing the average refractive index of the scavenging copolymer/co-oligomer. The higher refractive index of the scavenger polymer produces a better match with the refractive index of the matrix polymer, contributing to a better transparency of the blends and the products made with them, like bottles and films. Comonomers containing aromatic rings, hetero-aromatic rings, sulfur and/or halogens, amongst others, would be typical for this application. A preferred comonomer would be styrene.

The compounds and their copolymers and co-oligomers thereof of this invention may be produced by direct polymerization of the appropriate comonomers (eg. butadiene (BD)+Styrene+Acrylamide with an N-aromatic or N-benzylic substituent), the polymerization of which is well known in the art.

The compounds, copolymers, and oligomers thereof of this invention may also be produced by the modification of previously prepared copolymers or co-oligomers. For instance, a copolymer or co-oligomer made from BD+Styrene+Maleic Anhydride (MA) (grafted or copolymerized) can be modified by reacting appropriate molecules with the MA moiety (eg. Amines with different substituents). As an example, a BD/Styrene/MA copolymer can be reacted with dibenzylamine to form a diamide group as the polar non-reactive compatibilizing group. Another example is the reaction of BD/Styrene/MA copolymer with p-Aminobenzamide, forming the corresponding imide. The side groups formed is both an imide and an amide, of high polarity, which contribute to the compatibilization of the scavenger material with the matrix polymer (eg. PET).

One such class of isoprene derivatives are those derived from farnesene. It is important to note that when a compound containing separated allyl groups is mixed with a compound containing double allyl groups, the mixture has enhanced oxygen scavenging as the compound with the double allylic group acts an initiator of the oxygen scavenging reaction, thus reducing the induction period.

It has also been discovered that it is not enough just have a blend of these components, but that these compounds must exist at least partly in a separate phase in order to scavenge oxygen. The numerical average domain size in the melt blended unoriented polyester matrix as measured by TEM of less than 300 nm are preferred, with less than 200 nm even more preferred, and less than 100 nm even more preferred, with less than 50 nm the most preferred. In the case of domains having a slight ellipsoidal distortion, the size of the domain is the well known formula of the Square Root of the longest dimension times the shortest dimension. In the case of the sphere, both dimensions are the same and therefore the square root of the same number multiplied by itself is the number.

The value is the domain as measured, without adjusting for the fact that the TEM does not measure the exact diameter of each domain due to the well known issue of non-diametric cutting. ASTM does provide a mathematical adjustment to obtain the true domain size from the non-diametric cuts. If that mathematical adjustment is used, then the preferred domain size must be increased by the adjustment factor as well.

Both treatments will describe the same system.

The presence of a separate phase is also indicated by an increase in haze compared to the haze of the composition without the scavenging compound.

That a separate phase is necessary for the reaction with oxygen was demonstrated by

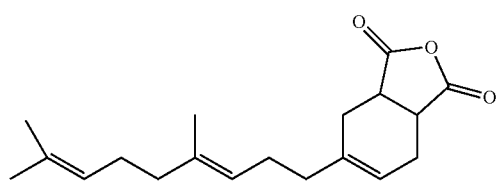 [SMILES: CC(C)=CCC/C(C)=C/CCC1=CCC2C(=O)OC(=O)C2C1]

Molecule A, made by the reaction of B-Farnesene with maleic anyhydride was combined in polyester. There was no reactivity with oxygen until molecule A reached 2.5 wt % of the composition, which at the same time was the level at which haze was noticed in the polyester bottle.

The same observations were made with the following molecule,

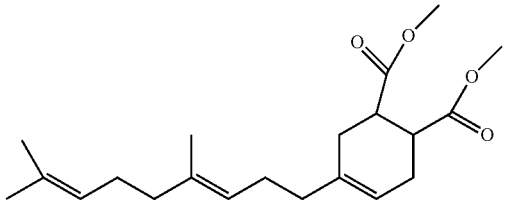 [SMILES: COC(=O)C1CC=C(CC/C=C(\C)CCC=C(C)C)CC1C(=O)OC]

Molecule C, noting the allyl groups in the ring. Blends of this product with polyester at low levels (2% by weight) scavenged Oxygen but produced a hazy bottle.

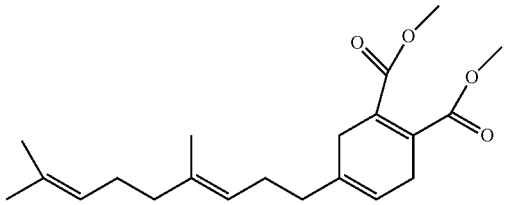 [SMILES: COC(=O)C1=C(C(=O)OC)CC(CC/C=C(\C)CCC=C(C)C)=CC1]

Molecule D, having the double allyl groups in the ring, shows excellent oxygen reactivity in its own right. However, when combined with a compound with an allylic bond, such as compound C, the double allyl groups act an initiator of the reaction of oxygen with compound C in the presence of a cobalt compound. The ratio by moles of the amount the compound with the double allyl groups to the moles of the compound without the double allyl groups in the composition is preferably greater than 1:20 being preferred, with 1:10 being more preferred, with greater than 1:4 being even more preferred, with greater than 1:3 being more preferred, with greater than 1:2 being even more preferred with greater than 1:1 being most preferred.

The amount of the compound, its copolymers or co-oligomers thereof should be present at a amount in the range of 0.1 to 5 percent by weight of the total composition. A more useful amount is in the range of 0.15 to 2 percent by weight of the total composition. An even more useful amount is in the range of 0.15 to 1.5 percent by weight of the total composition.

The composition is made by melt mixing the matrix polymer, e.g. PET, the catalyst, and the specially modified copolymer or oligomer. Typically this is done in an extruder, at or above the melt point of the matrix polymer. The composition can be pelletized or made directly into an article such as a preform.

The preferred article is a container. References to the container sidewall and container wall of this invention also refer to the lid, bottom and top sides of the container, and a film that may be wrapped around the product such as meat wraps. The container wall may be unstretched, completely stretched or have stretched and unstretched portions. For example, a reheat blown or injection stretch blown bottle is a container with a highly stretched portion in the middle of the wall, with the wall having successfully lower stretch until the wall is unstretched in the neck and thread areas. For clarity, the thread, neck, and sealing portions where the cap is applied are considered part of the wall of a container. In a reheat blown bottle the threads and neck area are generally unstretched. A preform or parison is also a container with at least one wall. Although an intermediate product, the preform is capable of containing a packaged content.

Stretching occurs when the molded article, film or fiber is heated or cooled to the elongation temperature of the composition. The elongation temperature is a temperature at which the article can be stretched and is usually the range of the 10° C. below the article's glass transition temperature and 10° C. below its melt point. The article is then usually restrained at least one point and subjected to a force which pulls or elongates the article. The article can be pulled or stretched in one or two, or in the case of a bubble, or bottle, three directions. A fiber or a uni-axial stretched film is an example of uni-axial stretching. A stretched fiber is pulled in the direction of its length to build strength. A film will be placed in machine called a tenter frame which has a sequence of gears that move progressively faster, thus stretching the film between each gear or other attaching mechanism.

In the case of bottles, bi-axially oriented films, or blown films, the article is stretched in at least two directions. In the case of a blown bottle or reheat blow or reheat stretch blow bottle, the preform is held steady at the threads and pressure such as compressed air is introduced into the article, also known as a preform or parison. The compressed air will then expand the article to take on the shape of the blow mould surrounding the article. Depending upon the design of the article and the mould, the article will have varying degrees of stretch in the two directions.

In films, there are some techniques which simultaneously stretch the article in the machine and transverse directions. However, in industrial practice it is more common to stretch the film first one way, then the other.

It is this stretched article where this composition is particularly useful. By lowering the interfacial tension so that the diameter of the domains of dispersed polymer are extremely small, the article can be stretched to higher levels, and still maintain a reduced haze appearance because the more of the stretched particles are still below the 400 nm or the wavelength of light.

The amount of stretch, also known as draw, is described as the stretch ratio or the area of stretch. In the case of a uni-axial stretch, the ratio is the length of the stretched article divided by the length of the unstretched article, where both lengths are measured in the direction of stretch. A 2 cm specimen stretched to 8 cm would have a stretch ratio of 4.

For a bi-axially stretched article, the ratio is often described as the stretch ratio of direction one multiplied by the stretch ratio of direction two, where direction one is perpendicular to direction two. Thus a an article stretched 3 times in one direction and 3 times in the other direction (perpendicular to the first direction) has a stretch ratio of 3×3 or 9. However, an article with a stretch ratio of 2 in one direction and 4.5 in the perpendicular direction also has a stretch ratio of 9.

Another technique to measure stretch ratio, draw ratio, or drawdown ratio is to trace or scribe a circle onto a plane of the article, measure the area of the circle, stretch the article, then measure the new area circumscribed by the enlarged circumference of the old circle. The stretch ratio is then the area of the new stretched circle divided by the area of the unstretched old circle. That stretch ratio can also be determined by using the ratio of the respective diameters or respective radii.

In the case of the three dimensional stretch, the change in volume or area of a sphere could be used to determine the stretch ratio.

Regardless of the technique used to measure the stretch ratio, stretching the molded article causes the dispersed component to stretch as well. Even if the dispersed component does not stretch, the domain surrounding the dispersed component will elongate. If the elongation of the domain whether it is completely filled with the dispersed material or not is greater than approximately 400 nm but less that about 720 nm, then the stretched article will have an increased Hunter Haze value, where haze is the measure of the amount of light deviation from the direction of transmittance by at least 2.5 degrees.

If enough of the particles have diameters between 400 and 720 nanometers, then the haze will be detectable by the human eye. As discussed below, the standard deviation of the particle size distribution becomes important as well.

It is therefore important that the diameter of the dispersed particle be small enough so that when stretched, the longest dimension of the dispersed particle and the domain encompassing the particle be less than 400 nm. For an article which stretches 3 in one direction and 3 in another, the maximum particle size in unstretched article should be 400 nm divided by 3, or 133 nm. For the article stretched 2×4.5, the particle size should be less than or equal to 400 divided by 4.5, or 89 nm. The target average diameter of the dispersed particles in the unstretched matrix phase could then be easily expressed as 400 divided by longest dimension of stretch. For example, if the final stretch dimension was 7×2, then the goal would be to modify the interfacial tension so that the average particle diameter in the unstretched article would be 400 divided by 7, or 57 nm. It is not only important that the average diameter be below a certain size, but that the distribution be narrow enough to reduce the number of dispersed particles which will exist between 400-700 nm after stretching. The goal is to minimize the number of domains in the visible region, therefore reducing the average domain size is important, but reducing the wide distribution is also important.

The thickness of the wall of the container of this invention can range from 0.01 mm in the case of a film to the thickness of a preform which is usually less than 6.5 mm. In the case of the bottle, the stretched wall usually has a thickness of 0.2 to 0.9 mm. A container wall can also consist of layers of varying thickness, the thickness of the layers is usually between 0.02 and 0.2 mm. A monolayer, which is the preferred wall of the container, consists of one layer. A monolayer of the polyester-polyamide dispersion would consist of one layer. This does not mean that monolayer could not have a label wrapped around it. It would still be a mono-layer bottle. In contrast, the multilayer bottle would contain at least one layer of the composition.

EXPERIMENTAL

Different polybutadiene oligomers (referred here as PBDs) were tested as Oxygen scavengers, in combination with transition metal catalysts (Co and Mn). The PBDs and metal salt masterbatches were blended with commercial bottle grade PET pellets nominally 0.8 dl/g I.V. and the mixture fed to an injection machine to produce 28 g preforms. Preforms were then blow melded into 500 ml bottles, which were analyzed for Fibox O₂ barrier analysis and haze measurements.

PBDs can be either butadiene (BD) homopolymers (only BD in the main chain) or copolymers (containing for instance Styrene as a comonomer), without any additional polar moiety. Table 1 presents some characteristics of such control PBDs employed in this study.

TABLE 1

Non-functionalized PBD

| Product name | Mn | Styrene content (%) | Supplier |
|---|---|---|---|
| Ricon 181 | 3200 | 20-30 | Sartomer |
| Ricon 131 | 4500 | 0 | Sartomer |

Additionally, these PBDs may contain a grafted moiety having at least one reactive functional group, typically obtained by the reaction of the PBDs with maleic anhydride (MA) or other unsaturated comonomers.

Table 2 presents the characteristics of some PBDs reacted with MA employed in this study.

TABLE 2

Maleic Anhydride + PBD

| Product name | Mn | average Anhydride groups/chain | Styrene content (%) | Supplier |
|---|---|---|---|---|
| Ricon 131MA5 | 4700 | 2 | 0 | Sartomer |
| Ricon 131MA10 | 5000 | 5 | 0 | Sartomer |
| Ricon 184MA6 | 9100 | 6 | 17-27 | Sartomer |

The PBD-MA control was modified through the reaction of PBD-MA with p-Aminobenzamide (pABA), forming a cyclic imide, as show in the reaction below. In the reaction, the PBD-MA is the copolymer or oligomer with at least one co-monomer containing allyl groups. The cyclic imide arising from the reaction of the pABA with PBD-MA is the polar, non-reactive moiety. The compound resulting from the reaction is an example of the type of oxygen scavenger of the invention.

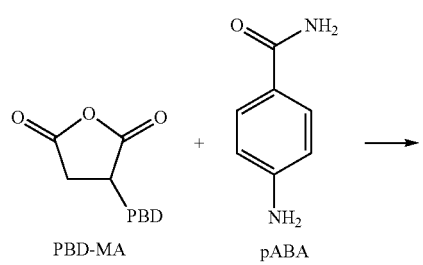

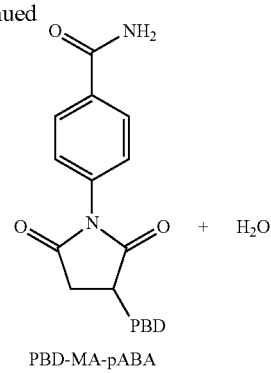

PBD-MA-pABA

The products were generically named "PBD-MA"-pABA, with the expression "PBD-MA" replaced by the commercial code of the oligomer employed. Stoichiometric amounts of pABA were employed, as compared to the MA groups. So, for instance, 184MA6-pABA is the product obtained from the reaction of Ricon™ 184MA6 with stoichiometric amounts of pABA.

FIG. 1 shows the bottle haze results obtained with different PBDs at 0.5% wt concentration in CLEARTUF® Turbo LT, a bottle grade commercial PET manufactured by M&G. Bottles obtained with non-functionalized PBDs, Ricon™ 131 (PBD homopolymer) and Ricon™ 181 (PBD/Styrene copolymer) are clearly very hazy. This is certainly due to the poor dispersion of these non-polar PBDs into the-PET.

FIG. 1 also shows that grafting MA into PBD reduces bottle haze. Haze reduction is a function of MA amount. It is worthwhile to mention that bottles made with Ricon™ 131MA5 are considerably hazier than the ones made with Ricon™ 131MA10, due to the increased dispersability through chemical reactions.

Interestingly, bottles produced with PBD-MA-pABA had low haze and are at least as good as the ones produced with PBD-MA (or slightly better), as seen in FIG. 1. So, physical compatibilization here was at least as effective as the best cases tested with chemical compatibilization.

In the experiments the PBDs containing styrene as a comonomer produced lower haze bottles.

Figure 2:
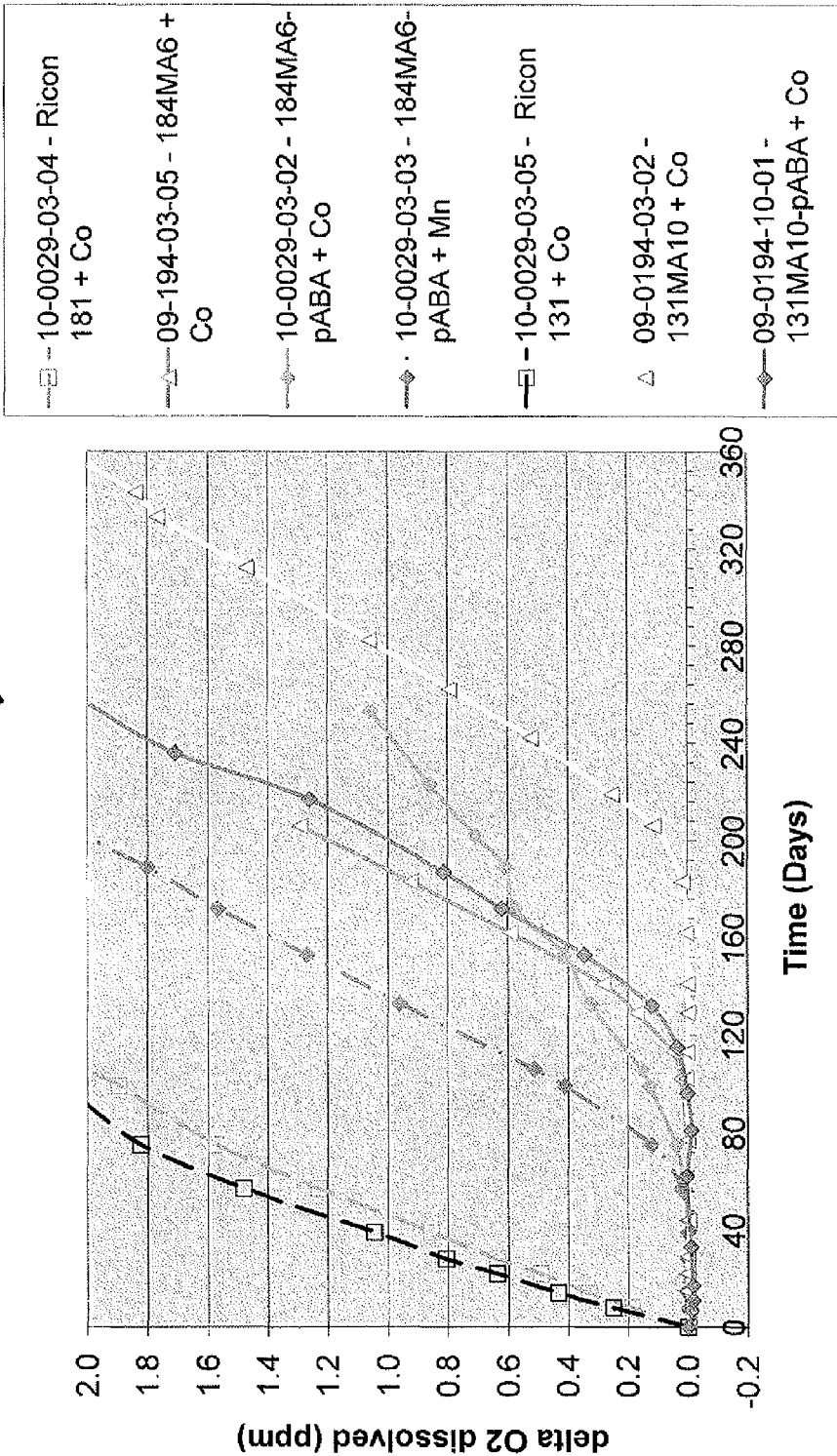
FIG. 2 depicts the amount of oxygen ingress into containers made from the various embodiments and comparative examples.

FIG. 2 shows oxygen ingress amounts based upon the Fibox analysis method for different PBDs. It is readily apparent that the non-functionalized PBDs (Ricons 131 and 181) were not active as O₂ scavenger substrates, while the ones containing either MA or MA-pABA were quite active thus indicating that that polar groups are favorable to the oxidation of these PBDs. It is demonstrated also that Mn can be an active catalyst, although slightly less active than Co (compare samples 184MA6–pABA+Co with 184MA6–pABA+Mn).

PBDs containing styrene were less active than the ones containing only BD in the main chain. This was expected, since BD polymers are in general more oxidizable than styrene polymers, Other experiments were run with molecule A, C, and D as described earlier. The observational notes are pointed out in the earlier part of the description section.

We claim:
1. A composition comprising
   a melt blend comprising a continuous polyester phase selected from the group consisting of polyethylene terephthalate, copolymers of polyethylene terephthalate and poly lactic acid, a salt selected from the group consisting of cobalt and manganese compounds, and a first scavenging compound or an oligomer or a polymer or mixtures thereof comprising the first scavenging compound wherein the first scavenging compound comprises

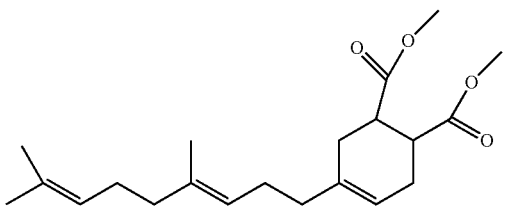

and at least some of the first scavenging compound or the oligomer or the polymer comprising the first scavenging compound is not present in the continuous polyester phase.

2. The composition of claim 1, wherein the composition further comprises a second scavenging compound or an oligomer or a polymer and mixtures thereof comprising the second scavenging compound and the second scavenging compound or the oligomer or the polymer and mixtures thereof comprises at least one double allylic group and at least one polar moiety.

3. The composition of claim 2, wherein the second scavenging compound comprises

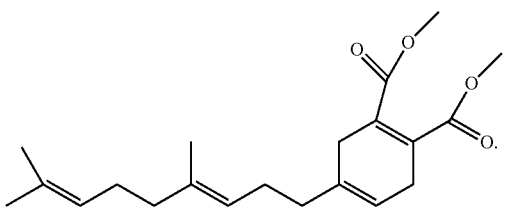

4. The composition of claim 1, where the first scavenger compound is not an antimony reducing scavenger.

5. The composition of claim 2, wherein the ratio of moles of the second scavenger compound to moles of the first scavenger compound is greater than 1:20.

6. The composition of claim 2, wherein the ratio of moles of the second scavenger compound to moles of the first scavenger compound is between 1:10 and 1:20.

7. The composition of claim 2, wherein the ratio of moles of the second scavenger compound to moles of the first scavenger compound is between 1:4 and 1:20.

8. The composition of claim 2, wherein the ratio of moles of the second scavenger compound to moles of the first scavenger compound is between 1:3 and 1:20.

9. The composition of claim 2, wherein the ratio of moles of the second scavenger compound to moles of the first scavenger compound is between 1:2 and 1:20.

10. The composition of claim 2, wherein the ratio of moles of the second scavenger compound to moles of the first scavenger compound is between 1:1 and 1:20.

11. The composition of claim 2, wherein the composition further comprises a third scavenging compound or an oligomer or a polymer and mixtures thereof comprising the third scavenging compound and the third scavenging compound or the oligomer or the polymer and mixtures thereof comprises

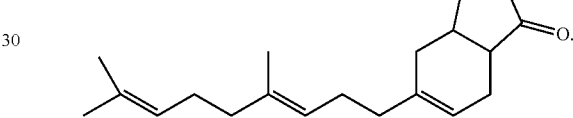

12. A container made from the composition of claim 2.

13. The container of claim 12, wherein the container is a preform.

14. The container of claim 12, wherein the container comprises a stretched wall.

* * * * *